Aug. 2, 1927.
B. M. SWANSON
1,637,757
INSTRUMENT FOR GAUGING INTERNAL TAPERS
Filed Feb. 28, 1925
FIG.I.
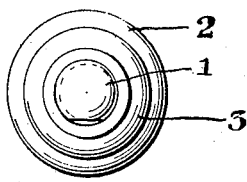
FIG.2.
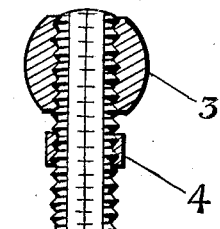
FIG.3.
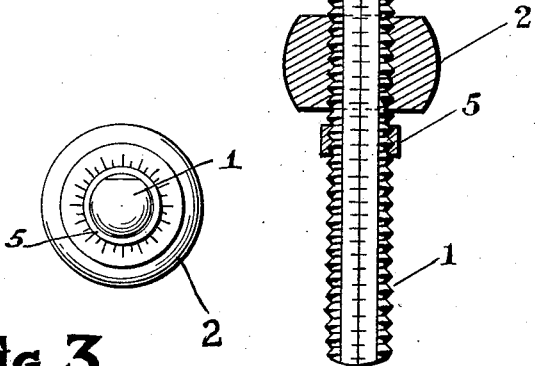
Witness.
Mrs. Hulda Drygg.
Miss Signe Swanson.
INVENTOR
Bernhard. M. Swanson.
BY
ATTORNEY Patented Aug. 2, 1927.

1,637,757

UNITED STATES PATENT OFFICE.

BERNHARD M. SWANSON, OF LOS ANGELES, CALIFORNIA.

INSTRUMENT FOR GAUGING INTERNAL TAPERS.

Application filed February 28, 1925. Serial No. 12,464.

My invention relates generally to taper gauges and more particularly to an improved method of finding internal tapers, with micrometer exactness.

The primary object of my invention is to make a practical use of the following principle:

That, if two spherical balls of unequal diameters be placed upon a flat surface a certain distance apart, two straight edges touching these two balls will represent a certain taper.

By knowing the diameter of said balls and the distance they are apart, the taper can be accurately determined.

With the foregoing and other objects in view, my invention consists in certain novel features of construction and arrangement of parts that will be hereinafter more fully described and claimed, and illustrated in the accompanying drawing, in which:

Figure 1 is a top plan view showing my invention.

Figure 2 is an elevation of the same, showing parts 2, 3, 4 and 5, in section.

Figure 3 is a plan view of member 2, showing graduation marks.

The numbers used in referring to parts are the same throughout.

The said members 3 and 2 are balls of unequal diameters, faced to a convenient width and internally threaded to screw smoothly on a threaded rod 1.

The rod 1, Figs. 1 and 2, is threaded to receive internally threaded members 3, 4, 2 and 5. Said rod 1 has a flat surface running lengthwise, upon which is a line and suitable graduations to cooperate with graduation marks on spherical members 3 and 2, in reading micrometer adjustment of members 3 and 2 on threaded rod 1. The round members 4 and 5 are lock nuts, designed to lock spherical members 3 and 2 to rod 1 when in an adjusted position.

The principle upon which my taper gauge works is the increasing or decreasing of the distance between spherical members 3 and 2 on rod 1. For convenience, I will lock member 3 in a permanent position, and use member 2 for adjusting or reading of tapers. This I will accomplished by inserting member 3 in the hole to be measured until it bears against the walls of the smaller end of the hole. The graduation on member 2 and rod 1 will give the exact distance the members 3 and 2 are apart when bearing on the large and small end of a hole.

With tables and formulas, these measurements can quickly be translated into any taper or angle required.

It will be readily understood that minor changes in the form, size and arrangement of the various parts of my gauge may be made and substituted for those herein shown and described without departing from the spirit of my invention, the scope of which is set forth in the appended claim:

I claim as my invention:

A gauge comprising an elongated threaded member provided with graduations of length, two spherical members of unequal diameters threaded on said member and provided with graduations adapted to cooperate with the graduations on said elongated member, and means for locking said spherical members on said elongated member in adjusted position.

BENNY M. SWANSON.